United States Patent Office 3,151,052
Patented Sept. 29, 1964

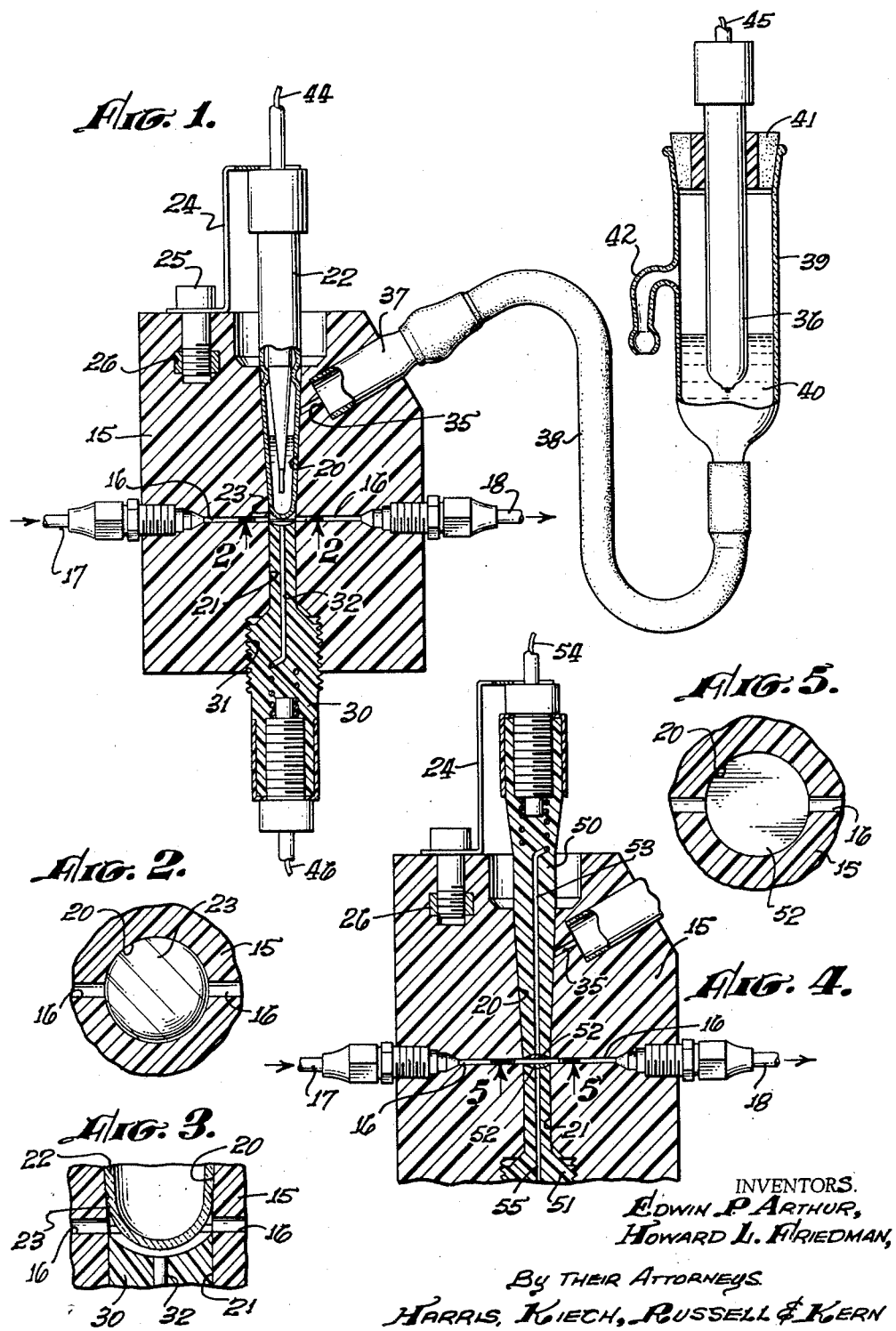

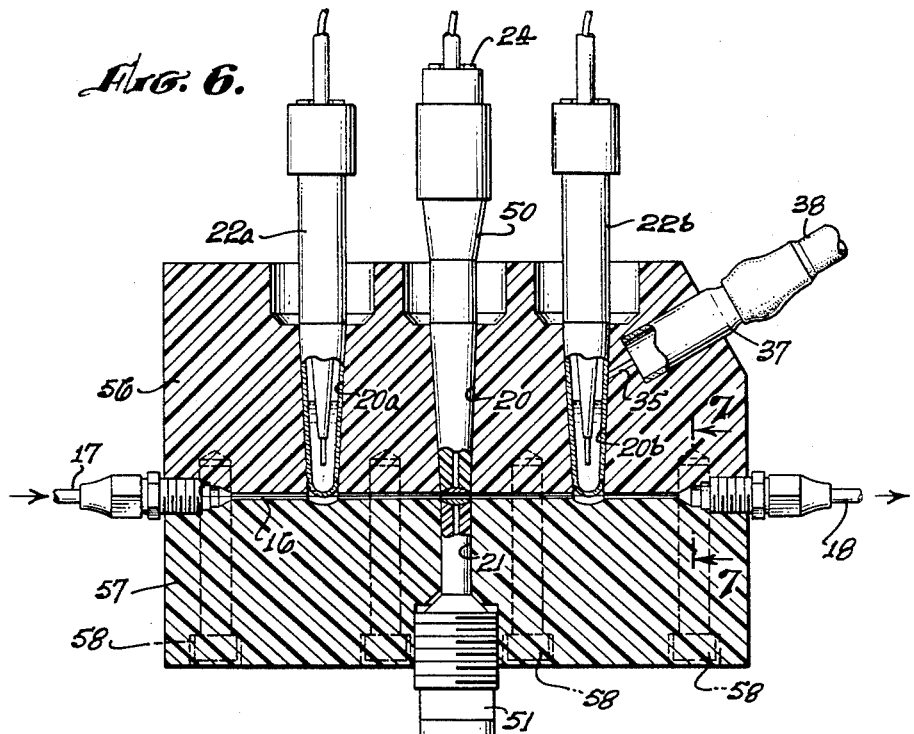
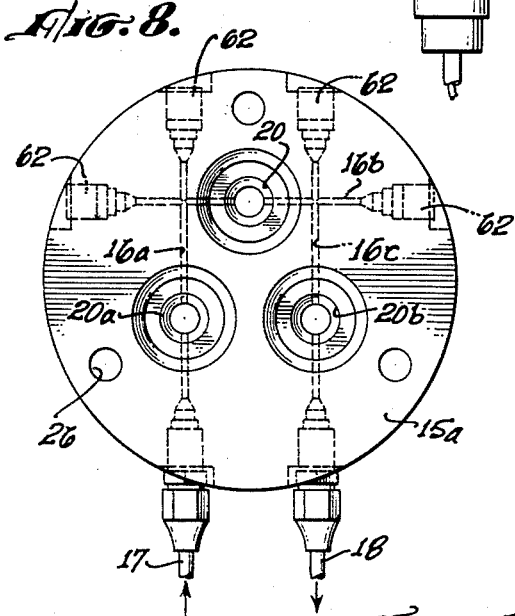
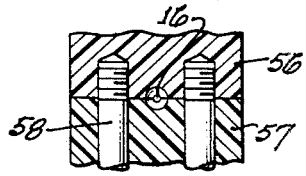

3,151,052
ELECTROCHEMICAL FLOW CELL
Edwin P. Arthur, Fullerton, and Howard L. Friedman, San Jose, Calif., assignors to Beckman Instruments, Inc., a corporation of California
Filed May 17, 1962, Ser. No. 195,540
16 Claims. (Cl. 204—195)

This invention relates to electrochemical measurements such as ion concentration and conductivity in liquid streams and, in particular, to a new and improved flow cell suitable for use in performing such measurements.

It is often desirable to analyze very small samples, samples with very low flow rates, samples flowing in very small passages or cannulae, and the like. Accurate measurements are desired and oftentimes, continuous measurements are desired. It is an object of the present invention to provide a flow cell suitable for such measurements. Typical applications for such an instrument include testing of pilot plant streams, costly materials, secretions such as saliva, drainage of wounds, tumors, and the like.

The invention contemplates a cell block for insertion into a flow line and carrying one or more electrodes, with the block including a cannula or small flow passage therethrough, means for supporting the electrodes in fixed or controlled relation with respect to the cannula and means for forming an adjustable analysis zone in the cannula.

It is an object of the invention to provide a flow cell for electrochemical measurements including a block of electrical insulating material having a cannula therethrough and first and second passages on opposite sides of the cannula and communicating between the cannula and the exterior of the block, first means positioned in and closing the first passage and having an end with the block and first means including means for maintaining the first means in a predetermined position in the first passage with the end substantially at the cannula, and second means positioned in and closing the second passage and having an end, with the block and second means including adjustment means for selectively positioning the second means in the second passage with the end substantially at the cannula defining an analysis zone in the cannula between the ends, and with the adjustment means controlling the relative position of the ends and the size of the zone.

It is an object of the invention to provide such a flow cell in which the first passage is a tapered structure converging toward the cannula and the electrode positioned therein has a mating taper for closing the passage and precisely locating the electrode in the passage. A further object is to provide a flow cell which is suitable for use with various types of electrodes. A particular object is to provide such a structure wherein both the upper and lower electrodes have noble metal conductors at the ends thereof providing a conductivity cell for determining the conductivity of the fluid flowing through the cannula at the analysis zone.

It is an object of the invention to provide such an instrument in which the tapered electrode may be a glass electrode for ion potential measurement and including a salt bridge connection between a reference electrode and the analysis zone through the taper joint. A further object is to provide such an instrument in which the second electrode in line with the glass electrode has a concave end substantially mating with the convex end of the glass electrode and is movable relative to the glass electrode for precisely defining the size and shape of the analysis zone. Another object is to provide such a structure in which the second electrode may be an insulator or may include a conductor to function as a solution ground.

It is a particular object of the invention to provide such a flow cell in which the block comprises block units joined along mating surfaces defining the cannula therebetween, with the block units being separable for ease of access and cleaning of the cannula. A further object is to provide such a flow cell having two or more electrodes for contacting the sample at spaced points along the cannula permitting a plurality of measurements to be made simultaneously.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a sectional view of a preferred form of the invention;

FIG. 2 is an enlarged partial sectional view taken along the line 2—2 of FIG. 1;

FIG. 3 is an enlarged view of a portion of the unit of FIG. 1;

FIG. 4 is a sectional view similar to that of FIG. 1 for an alternative form of the invention;

FIG. 5 is an enlarged partial sectional view taken along the line 5—5 of FIG. 4;

FIG. 6 is a sectional view of another form of the invention;

FIG. 7 is a partial sectional view taken along the line 7—7 of FIG. 6; and

FIG. 8 is a top plan view of another alternative form of the invention.

The instrument of FIG. 1 includes a block 15 of electrically insulating material having a small flow passage or cannula 16 therethrough. One end of the cannula may be threaded to receive an inlet conduit 17 and the other end threaded to receive an outlet conduit 18. Passages 20, 21 extend from the cannula to the exterior of the block, preferably being aligned as shown in FIG. 1.

The passage 20 is preferably formed with a taper converging toward the cannula for receiving an electrode 22 having a mating taper. The electrode 22 is a conventional glass electrode for ion potential measurement such as pH or the like, and includes a sensitive glass membrane 23 at the lower end. The tapered electrode 22 may be held in place by a spring clip 24 fastened to the block 15 by a screw 25 engaging a nut 26 molded in the block.

The passage 21 is preferably cylindrical for slidingly receiving a member such as another electrode 30 and includes means for adjusting the position of the electrode in the passage. The adjustment means ordinarily comprises a threaded opening 31 for receiving a threaded portion of the sliding member. In the embodiment shown herein, the electrode 30 is formed of insulating material with a noble metal conductor 32 extending to the upper end thereof.

Another passage 35 is provided between the passage 20 and the exterior of the block. The passage 35 is used to provide a salt bridge connection between a reference electrode 36 and the sample in the cannula 16. A typical installation includes a tube 37 fitted in the passage 35, and a flexible tube 38 providing communication between the passage and a container 39 with overflow 42, for the salt bridge solution 40. If high pressure develops in the cannula, viz., high pressure in the sample stream, a small fraction may be allowed to escape via the salt bridge and discharge at atmospheric or ambient pressure where the liquid junction is made with the voltage reference electrode 36. This renders measurements substantially independent of pressure variation in sample flow. The reference electrode is supported in the container by a flange member 41. An electrolytic path exists between the passage 35 and the cannula and may be provided by various means such as by a light scratch in block 15 along the surface of the passage 20.

The flow cell of FIG. 1 may be used for pH measurements by connecting the glass electrode 22 and the reference electrode 30 through leads 44, 45, respectively to a conventional pH meter amplifier. The conductor 32 may be connected through another lead 46 to circuit ground to provide a ground connection for the sample solution when desired. For applications where a sample ground is not sought, the conductor 32 may be omitted from the member 30.

In the initial operation of the cell, the electrode with the taper is installed first in the passage 20. Then the adjustable electrode 30 is installed and its position in the passage 21 is adjusted so that the zone between the electrodes is a minimum without inhibiting stream flow. This may be accomplished by moving the electrode 30 inward to shut off flow and then retracting the electrode 30 until the flow is re-established.

The flow cell of the invention provides accurate and continuous measurement of very small sample streams. In a typical installation, the cannula 16 is 0.025 inch diameter. The lower passage 21 is 0.185 inch diameter and the upper passage 20 is 0.185 inch diameter at its lower end with a one-to-ten taper. The concave end of the lower electrode 30 has a 0.125 inch radius which substantially matches the radius of the membrane 23 of the glass electrode. Conventional flow chambers allow a dead spot or reduced stream velocity at sensing surfaces. This improved construction substantially eliminates such dead spots and the resulting difficulties, such as sluggish response and the like.

While described for pH measurements above, it should be noted that the flow cell may be used with all types of electrochemical electrodes, including glass electrodes for pNa and pK, metallic electrodes for redox and sulphide and halide ion measurements, and the like. An alternative form of the cell adapted for conductivity measurements is shown in FIG. 4. The block 15 may be identical to the block of the cell of FIG. 1. The passage 35 is not necessary for conductivity measurements, but permits a single block to be used for both types of measurements. An upper tapered electrode 50 is positioned in the passage 20 and is held in place by the spring clip 24. A lower cylindrical electrode 51 is positioned in the passage 21 and includes a threaded portion for engaging the threaded opening 31. Each of the electrodes 50, 51 has a conductor 52, preferably of a noble metal such as platinum, carried at the end thereof. Another conductor 53 connects the conductor 52 of the electrode 50 to a cable 54. Similarly, another conductor 55 connects the conductor 52 of the electrode 51 to its cable. This construction provides a very small conductivity flow cell and permits the volume of the zone in which the conductivity measurement is made to be precisely adjusted, with the greatest ease. By first positioning the tapered electrode 50 in the block, inserting a shim of predetermined thickness, and then seating the electrode 51. The electrode 50 may be lifted, the shim removed, and the electrode 50 replaced to yield a spaced position with reference to the electrode 51. Standard solutions can be used to check standard shims and vice versa.

Several variations of the flow cell are shown in the embodiment illustrated in FIG. 6. The block is split into two block units 56, 57 joined by a plurality of bolts 58. The cannula 16 is formed at the mating surfaces of the block units 56, 57 thus exposing the cannula for cleaning when the units are separated. The passages 20, 21 with electrodes 50, 51 may be identical to those shown in the embodiment of FIG. 4. Additional tapered passages 20A and 20B are provided in the block unit 56 for receiving additional electrodes, such as glass electrodes 22A and 22B. The passage 35 and the tubes 37, 38 provide the salt bridge connection for the reference electrode as in the embodiment of FIG. 1.

The structure of FIG. 6 permits the block units to be separated for cleaning of the small passages without disturbing the electrodes. The upper block unit 56 could be permanently mounted and only the single lower electrode would be disturbed, while its position in the lower block unit would not be affected during the cleaning operation. It should be noted that the split block construction may be used with the embodiments illustrated in FIGS. 1 and 4 also.

FIG. 8 shows a top plan view of another form of block 15A for carrying a plurality of electrodes in tapered passages 20, 20A, 20B with the flow passage comprising a plurality of short cannulae 16A, 16B, 16C in place of a single straight cannula. Plugs 62 close the ends of the cannulae except for the inlet 17 and outlet 18, thus providing the flow path past each of the electrode receiving passages.

Various other changes, modifications and substitutions may be made in the illustrated embodiments without departing from the spirit of the invention. The cannulae have been illustrated herein as horizontally disposed but may have any orientation. Problems with stray bubbles in the sample stream are reduced by providing an uphill flow for the stream. The block 15 has been described as of insulating material. However, it should be noted that it may be of a conducting material with insulating liners defining the passages therein.

We claim as our invention:

1. In a flow cell for electrochemical measurements, the combination of:

a block of electrical insulating material having a cannula therethrough, and first and second aligned passages on opposite sides of said cannula communicating between said cannula and the exterior of said block, with said first passage having a taper converging toward said cannula;

first electrode means positioned in said first passage and having an end, said first electrode means having a mating taper for closing said passage and fixing said end in a predetermined position substantially at said cannula;

second electrode means electrolytically connected to said cannula; and a movable member positioned in and closing said second passage and having an end, said block and said movable member including adjustment means for selectively positioning said movable member in said second passage with the end substantially at said cannula for controlling the relative position of said ends.

2. In a flow cell for electrochemical measurement, the combination of:

a block of electrical insulating material having a cannula therethrough, and first and second aligned passages on opposite sides of said cannula and communicating between said cannula and the exterior of said block;

first electrode means positioned in and closing said first passage and having a noble metal conductor at an end, said block and said first electrode means including means for maintaining said first electrode means in a predetermined position in said first passage with said end substantially at said cannula; and second electrode means positioned in and closing said second passage and having a noble metal conductor at an end, said block and said second electrode means including adjustment means for selectively positioning said second electrode means in said second passage with said end substantially at said cannula defining an analysis zone in said cannula between said ends, with said adjustment means controlling the relative position of said ends and the size of said zone.

3. In a flow cell for electrochemical measurements, the combination of:
a block of electrical insulating material having a cannula therethrough, and first and second passages communicating between said cannula and the exterior of said block, with said first passage having a taper converging toward said cannula, said block having a third passage communicating between said taper and the exterior of said block;
an ion sensitive glass electrode positioned in said first passage and having a convex end, said glass electrode having a mating taper for closing said passage and fixing said end in a predetermined position substantially at said cannula;
a reference electrode;
means including a salt bridge electrolyte for coupling said reference electrode to said third passage, with said first passage taper and electrode taper providing an electrolytic path between said cannula and said third passage; and
a second member positioned in and closing said second passage and having an end, said block and second member including adjustment means for selectively positioning said member in said second passage with the end substantially at said cannula for controlling the relative position of said ends.

4. In a flow cell for electrochemical measurements the combination of:
a block of electrical insulating material having a cannula for a sample stream therethrough, and first and second passages communicating between said cannula and the exterior of said block, with said first passage having a taper converging toward said cannula, said block having a third passage communicating between said taper and the exterior of said block;
an ion sensitive glass electrode positioned in said first passage and having a convex end, said glass electrode having a mating taper for closing said passage and fixing said end in a predetermined position substantially at said cannula;
a reference electrode;
means including a salt bridge electrolyte open to ambient atmosphere for coupling said reference electrode to said third passage, with said first passage taper and electrode taper providing an electrolytic path between said cannula and said third passage and providing a high pressure fluid flow path from said cannula to said salt bridge electrolyte for a small fraction of the sample stream in said cannula; and
a second member positioned in and closing said second passage and having an end, said block and second member including adjustment means for selectively positioning said member in said second passage with the end substantially at said cannula for controlling the relative position of said ends.

5. In a flow cell for electrochemical measurements, the combination of:
a block of electrical insulating material having a cannula therethrough, and first and second passages communicating between said cannula and the exterior of said block, with said first passage having a taper converging toward said cannula, said block having a third passage communicating between said taper and the exterior of said block;
an ion sensitive glass electrode positioned in said first passage and having a convex end, said glass electrode having a mating taper for closing said passage and fixing said end in a predetermined position substantially at said cannula;
a reference electrode;
means including a salt bridge electrolyte for coupling said reference electrode to said third passage, with said first passage taper and electrode taper providing an electrolytic path between said cannula and said third passage; and
a second member of insulating material positioned in and closing said second passage and having a concave end, said block and second member including adjustment means for selectively positioning said member in said second passage with the end substantially at said cannula for controlling the relative position of said ends and the size of the zone therebetween.

6. In a flow cell for electrochemical measurements, the combination of:
a block of electrical insulating material having a cannula therethrough, and first and second passages communicating between said cannula and the exterior of said block, with said first passage having a taper converging toward said cannula, said block having a third passage communicating between said taper and the exterior of said block;
an ion sensitive glass electrode positioned in said first passage and having a convex end, said glass electrode having a mating taper for closing said passage and fixing said end in a predetermined position substantially at said cannula;
a reference electrode;
means including a salt bridge electrolyte for coupling said reference electrode to said third passage, with said first passage taper and electrode taper providing an electrolytic path between said cannula and said third passage; and
a second member positioned in and closing said second passage and having a concave end with an exposed conductor, said block and second member including adjustment means for selectively positioning said member in said second passage with the end substantially at said cannula for contact of the conductor with fluid in the cannula and for controlling the relative position of said ends and the size of the zone therebetween.

7. In a flow cell for electrochemical measurements, the combination of:
a block of electrical insulating material having a cannula therethrough, the first and second passages on opposite sides of said cannula communicating between said cannula and the exterior of said block, with said first passage having a taper converging toward said cannula and with said second passage having a cylindrical zone adjacent said cannula, said block having a third passage communicating between said taper and the exterior of said block;
an ion sensitive glass electrode positioned in said first passage and having a convex end, said electrode having a mating taper for closing said passage and fixing said end in a predetermined position substantially at said cannula;
a reference electrode;
means including a salt bridge electrolyte for coupling said reference electrode to said third passage, with said first passage taper and electrode taper providing an electrolytic path between said cannula and said third passage; and
a second member having a cylindrical section slidably positioned in and closing said second passage and having a concave end substantially mating with said convex end, said block and second member including adjustment means for moving said member in said second passage with the end substantially at said cannula defining an analysis in said cannula between said ends, with said adjustment means controlling the relative position of said ends and the size of said zone.

8. In a flow cell for electrochemical measurements, the combination of:
a block of electrical insulating material having a cannula therethrough, and first and second aligned passages on opposite sides of said cannula communicating between said cannula and the exterior of said block, with said first passage having a taper converging toward said cannula;

first electrode means positioned in said first passage and having a noble metal conductor at an end, said first electrode means having a mating taper for closing said passage and fixing said end in a predetermined position substantially at said cannula; and second electrode means positioned in and closing said second passage and having a noble metal conductor at an end, said block and second electrode means including adjustment means for selectively positioning said electrode means in said second passage with the end substantially at said cannula for controlling the relative position of said ends and defining a flow path therebetween.

9. In a flow cell for electrochemical measurements, the combination of:

a block of electrical insulating material comprising block units joined along mating surfaces defining a cannula therebetween, said units having first and second aligned passages on opposite sides of said cannula and communicating between said cannula and the exterior of said block;

first electrode means positioned in and closing said first passage and having a noble metal conductor at an end, said block and said first electrode means including means for maintaining said first electrode means in a predetermined position in said first passage with said end substantially at said cannula; and second electrode means positioned in and closing said second passage and having a noble metal conductor at an end, said block and said second electrode means including adjustment means for selectively positioning said second electrode means in said second passage with said end substantially at said cannula defining an analysis zone in said cannula between said ends, with said adjustment means controlling the relative position of said ends and the size of said zone, and with said block units being separable for cleaning said cannula while maintaining the relative position of said ends when said units are rejoined.

10. In a flow cell for electrochemical measurements, the combination of:

a block of electrical insulating material comprising block units joined along mating surfaces defining a cannula therebetween, said units having first and second aligned passages on opposite sides of said cannula and communicating between said cannula and the exterior of said block, with said first passage in one block unit and having a taper converging toward said cannula and with said second passage in the other block unit and having a cylindrical zone adjacent said cannula;

first electrode means positioned in said first passage and having a noble metal conductor at an end, said first electrode means having a mating taper for closing said passage and fixing said end in a predetermined position substantially at said cannula; and second electrode means having a cylindrical section slidably positioned in and closing said second passage and having a noble metal conductor at an end, said other block unit and second electrode means including adjustment means for moving said electrode means in said second passage with said end substantially at said cannula for controlling the relative position of said ends.

11. In a flow cell for electrochemical measurements, the combination of:

a block of electrical insulating material having a cannula therethrough, and a pair of first passages spaced along said cannula and communicating between said cannula and the exterior of said block, and a second passage aligned with one of said first passages and communicating between said cannula and the exterior of said block;

first electrode means positioned in said one of said first passages and having a noble metal conductor at an end, an ion sensitive glass electrode means positioned in the other of said first passages and having an end, with said block and each of said electrode means including means for maintaining each of said electrode means in a predetermined position in the corresponding first passages with said ends substantially at said cannula;

reference electrode means electrolytically connected to said cannula; and another electrode means positioned in and closing said second passage and having a noble metal conductor at an end, said block and another electrode means including adjustment means for selectively positioning said another electrode means in said second passage with said end substantially at said cannula defining an analysis zone in said cannula between the ends in said aligned passages, with said adjustment means controlling the size of said zone.

12. In a flow cell for electrochemical measurements, the combination of:

a block of electrical insulating material having a cannula therethrough, and a pair of first passages spaced along said cannula and communicating between said cannula and the exterior of said block, each of said first passages having a taper converging toward said cannula, and a second passage aligned with one of said first passages and communicating between said cannula and the exterior of said block with said second passage having a cylindrical zone adjacent said cannula;

first electrode means positioned in said one of said first passages and having a noble metal conductor at an end, an ion sensitive glass electrode means positioned in the other of said first passages and having an end, each of said electrode means having a mating taper for closing the corresponding first passages and fixing the ends in a predetermined position substantially at said cannula;

reference electrode means electrolytically connected to said cannula; and another electrode means having a cylindrical section slidably positioned in and closing said second passage and having a noble metal conductor at an end, said block and another electrode means including adjustment means for moving said another electrode means in said second passage with said end substantially at said cannula for controlling the size of the zone between the ends of the electrode means in the aligned passages.

13. In a flow cell for electrochemical measurements, the combination of:

a block of electrical insulating material comprising block units joined along mating surfaces defining a cannula therebetween, said units having a plurality of first passages spaced along said cannula and communicating between said cannula and the exterior of said block, each of said first passages having a taper converging toward said cannula, and a second passage aligned with one of said first passages and communicating between said cannula and the exterior of said block, with said second passage having a cylindrical zone adjacent said cannula, and a third passage communicating between the taper of another of said first passages and the exterior of said block;

a first electrode means positioned in said one of said first passages and having a noble metal conductor at an end, said first electrode means having a mating taper for closing said passage and fixing said end in a predetermined position substantially at said cannula;

an ion sensitive glass electrode positioned in said other of said first passages and having an end, said glass electrode having a mating taper for closing said passage and fixing said end in a predetermined position substantially at said cannula;

a reference electrode;

means including a salt bridge electrolyte for coupling said reference electrode to said third passage, with the taper of said glass electrode and said other first passage providing an electrolytic path between said cannula and said third passage; and a second electrode means having a cylindrical section slidably positioned in and closing said second passage and having a noble metal conductor at an end, said block and second electrode means including adjustment means for selectively positioning said second electrode means in said second passage with the end substantially at said cannula for controlling the size of the zone between the ends of the first and second electrode means.

14. In a flow cell for electrochemical measurements, the combination of:

a block of electrical insulating material having a plurality of cannulae therethrough intersecting therein and including means at each end of each cannula for receiving closing means, said block having a pair of first passages with a first passage communicating between each cannula respectively and the exterior of said block, and having a second passage aligned with with one of said first passages and communicating between a cannula and said exterior;

first electrode means positioned in said one of said first passages and having a noble metal conductor at an end, an ion sensitive glass electrode means positioned in the other of said first passages and having an end, with said block and each of said electrode means including means for maintaining the electrode means in a predetermined position in the first passage with said end substantially at the cannula;

reference electrode means electrolytically connected to said cannula; and second electrode means positioned in and closing said second passage and having a noble metal conductor at an end, said block and second electrode means including adjustment means for selectively positioning said second electrode means in said second passage with the end substantially at the cannula defining an analysis zone in the cannula between the ends in said aligned passages, with said adjustment means controlling the size of said zone.

15. In a flow cell for electrochemical measurements, the combination of:

a block of electrical insulating material having a plurality of cannulae therethrough intersecting therein and including means at each end of each cannula for receiving closing means, said block having a pair of first passages with a first passage communicating between each cannula respectively and the exterior of said block, with each first passage having a taper converging toward the cannula, and having a second passage aligned with one of said first passages and communicating between a cannula and said exterior, with said second passage having a cylindrical zone adjacent the cannula;

first electrode means positioned in said one of said first passages and having a noble metal conductor at an end, an ion sensitive glass electrode means positioned in the other of said first passages and having an end, each of said electrode means having a mating taper for closing the passage and fixing said ends in a predetermined position substantially at the cannula;

reference electrode means electrolytically connected to said cannula; and second electrode means having a cylindrical section slidably positioned in and closing said second passage and having a noble metal conductor at an end, said block and second electrode means including adjustment means for moving said second electrode means in said second passage with the end substantially at the cannula for controlling the relative position of the ends in said aligned passages.

16. A flow cell as set forth in claim 1 wherein said ends of said first electrode means and said movable member have matching surfaces.

References Cited in the file of this patent

UNITED STATES PATENTS

| | | |
|---|---|---|
| 1,995,492 | Audrus et al. | Mar. 26, 1935 |
| 2,886,771 | Vincent | May 12, 1959 |
| 2,968,535 | Arthur et al. | Jan. 17, 1961 |
| 3,025,458 | Eckfeldt et al. | Mar. 13, 1962 |